United States Patent [19]

Bottomley

[11] Patent Number: 5,237,586
[45] Date of Patent: Aug. 17, 1993

[54] RAKE RECEIVER WITH SELECTIVE RAY COMBINING

[75] Inventor: Gregory E. Bottomley, Cary, N.C.

[73] Assignee: Ericsson-GE Mobile Communications Holding, Inc., Paramus, N.J.

[21] Appl. No.: 857,433

[22] Filed: Mar. 25, 1992

[51] Int. Cl.[5] .................. H04L 27/30; H04J 11/00; H04J 13/00
[52] U.S. Cl. ........................... 375/1; 380/34; 380/9; 370/18; 370/19; 370/20; 370/21; 370/22; 455/52.1; 455/65
[58] Field of Search .................. 375/1, 88, 91, 96, 100, 375/101; 380/34, 9; 370/18, 19, 21, 22, 20; 455/52.1, 65

[56] References Cited

U.S. PATENT DOCUMENTS

| | | | |
|---|---|---|---|
| 2,982,853 | 5/1961 | Price et al. | 375/96 X |
| 3,283,253 | 11/1966 | Ehrich et al. | 375/101 |
| 3,294,551 | 12/1966 | Ehrich | 375/101 |
| 4,134,071 | 1/1979 | Ohnsorge | 375/1 |
| 4,293,953 | 10/1981 | Gutleber | 375/25 |
| 4,470,138 | 9/1984 | Gutleber | 370/18 |
| 4,644,560 | 2/1987 | Torre et al. | 375/1 |
| 4,653,069 | 3/1987 | Roeder | 375/1 X |
| 4,901,307 | 2/1990 | Gilhousen et al. | 370/18 |
| 4,930,140 | 5/1990 | Cripps et al. | 375/1 |
| 4,984,247 | 1/1991 | Kaufmann et al. | 375/1 |
| 5,022,049 | 6/1991 | Abrahamson et al. | 375/7 |
| 5,048,059 | 9/1991 | Dent | 375/46 |
| 5,056,109 | 10/1991 | Gilhousen et al. | 375/1 |
| 5,101,501 | 3/1992 | Gilhousen et al. | 455/33.2 |
| 5,103,459 | 4/1992 | Gilhousen et al. | 375/1 |
| 5,109,390 | 4/1992 | Gilhousen et al. | 375/1 |

FOREIGN PATENT DOCUMENTS 0400314 12/1990 European Pat. Off. .

OTHER PUBLICATIONS

R. Kohno et al., "Adaptive Cancellation of Interference in Direct-Sequence Spread-Spectrum Multiple Access Systems", *Proceedings IEEE Global Telecommunications Conference* vol. 1, pp. 630-634 (Nov. 15, 1987).
T. Masamura, "Spread Spectrum Multiple Access System with Intrasystem Interference Cancellation", *Transactions of the Institute of Electronics and Communication Engineers of Japan,* Section E71, pp. 224-231 (Mar. 1, 1988).
Derwent Publications Ltd., London, GB, Week 9127 (Nov. 1990).
M. K. Varanasi et al., "An Iterative Detector for Asynchronous Spread-Spectrum Multiple-Access Systems", *Proceedings IEEE Global Telecommunications Conference* vol. 1, pp. 556-560 (Nov. 28, 1988).
R. A. Scholtz, "The Origins of Spread-Specetrum Communications" *IEEE Transactions on Communications.,* vol. COM-30, No. 5, pp. 18-21, (May 1982).
J. G. Proakis, *Digital Communications,* pp. 728-739, (McGraw Hill, 2nd Ed.), 1989.

(List continued on next page.)

*Primary Examiner*—Bernarr E. Gregory
*Attorney, Agent, or Firm*—Burns, Doane, Swecker & Mathis

[57] ABSTRACT

A modified RAKE receiver, referred to as a WRAKE receiver, is used in CDMA communications. It is particularly adaptable to a subtractive CDMA system. The receiver includes a radio receiver for receiving and demodulating a composite signal of overlapping transmitted signals (spread signals), a sampler to sample the received signals, a selector for selecting different groups of samples, a correlator for correlating the samples with known despreading codes and a comparator to determine the symbol transmitted. The receiver also includes a combiner which combines either different groups of samples together or combines different correlation values together. The sample groups selected are channel independent and combine data received from different time shifts. Likewise, the sample groups for each channel and the correlation values are time-of-arrival independent.

58 Claims, 11 Drawing Sheets

OTHER PUBLICATIONS

P. Monsen, "Fading Channel Communications", *IEEE Communications Magazine,* vol. 18, pp. 16–25, (Jan. 1980).

R. Price et al, "A Communication Technique for Multipath Channels", *Proceedings of the IRE,* vol. 46, pp. 555–570, (Mar. 1958).

G. L. Turin, "Introduction to Spread-Spectrum Antimultipath Techniques and Their Application to Urban Digital Radio", *Proc. of the IEEE,* vol. 68, No. 3 pp. 328–353, (Mar. 1980).

N. S. Tzannes, *Communication and Radar Systems,* Chapter 9, pp. 227–239, (Prentice-Hall, Inc., 1985).

F. G. Stremler, *Introduction to Communication Systems,* pp. 406–418, (Addison-Wesley Publishing Company, 2nd Ed., 1982).

"A Class of Low-Rate Nonlinear Binary Codes", A. Kerdock, Information and Control, vol. 20, pp. 182–187 (1972).

MacWilliams, F., *The Theory of Error-Correcting Codes, Part I and II,* New York: North-Holland, 1988, pp. 93–124; 451–465.

"Very Low Rate Convolutional Codes for Maximum Theoretical Performance of Spread-Spectrum Multiple-Access Channels" A. Viterbi, IEEE Journal on Selected Areas in Communications, vol. 8, No. 4, May 1990, pp. 641–649.

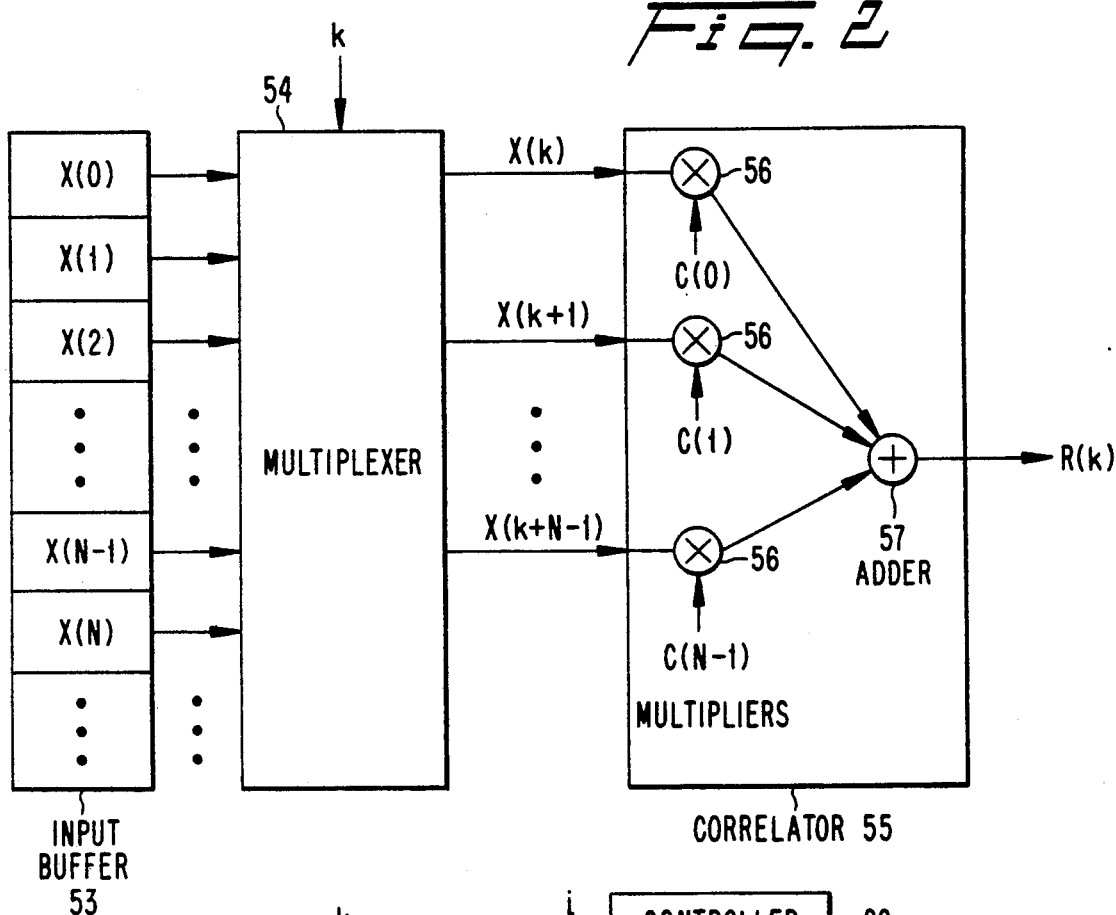
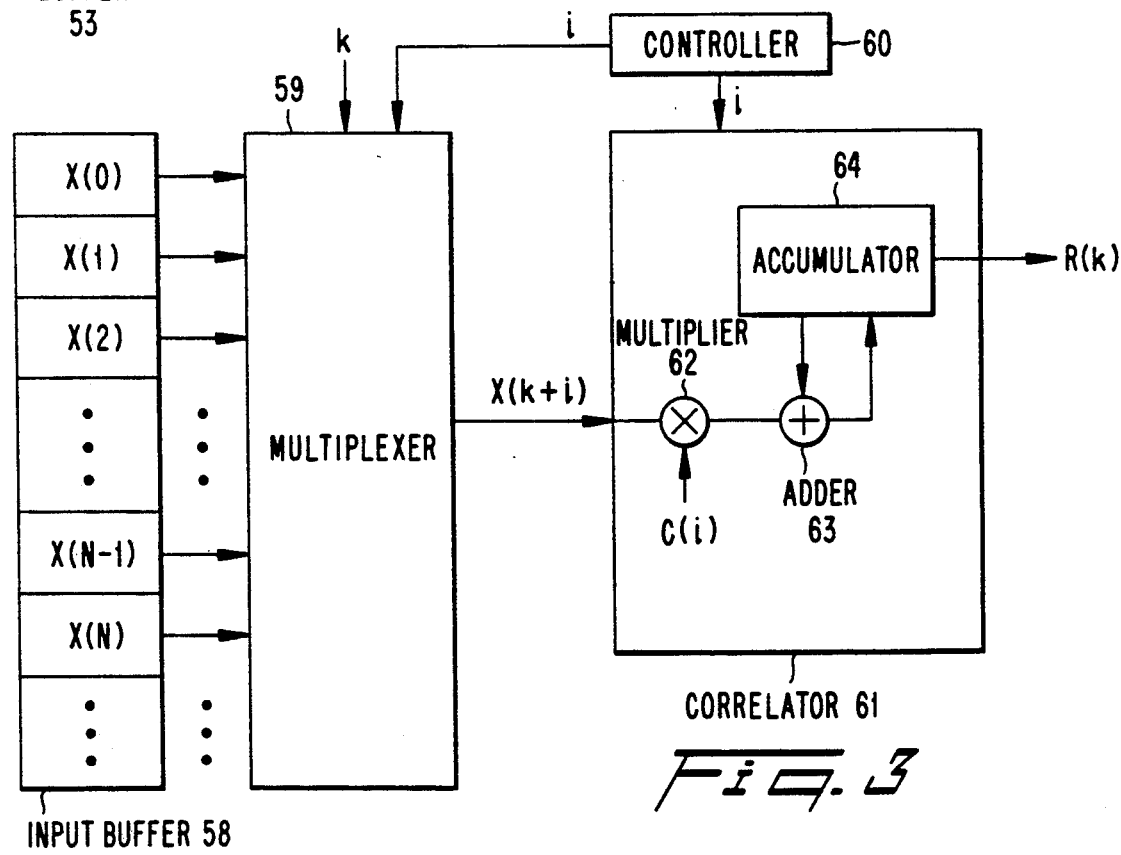

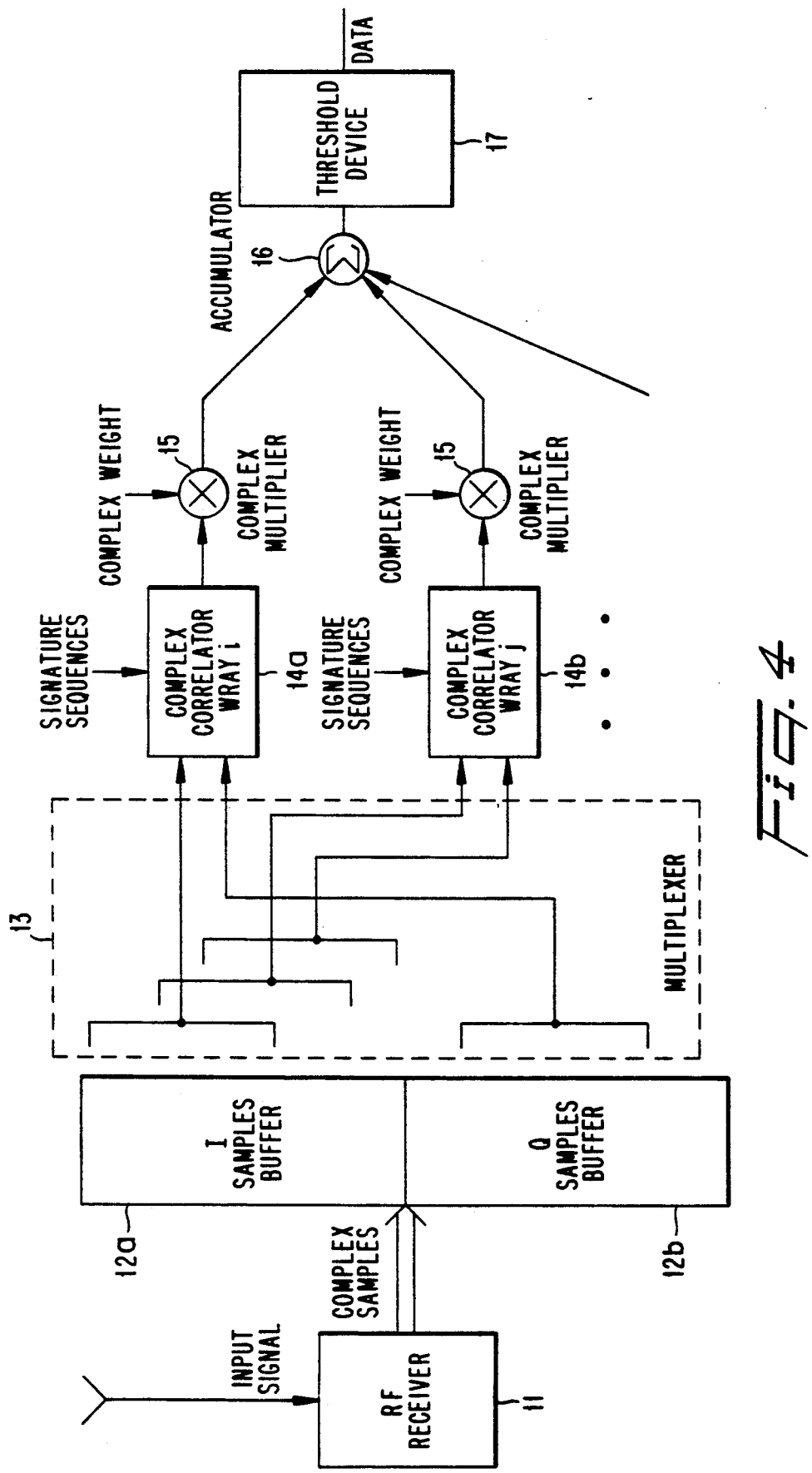

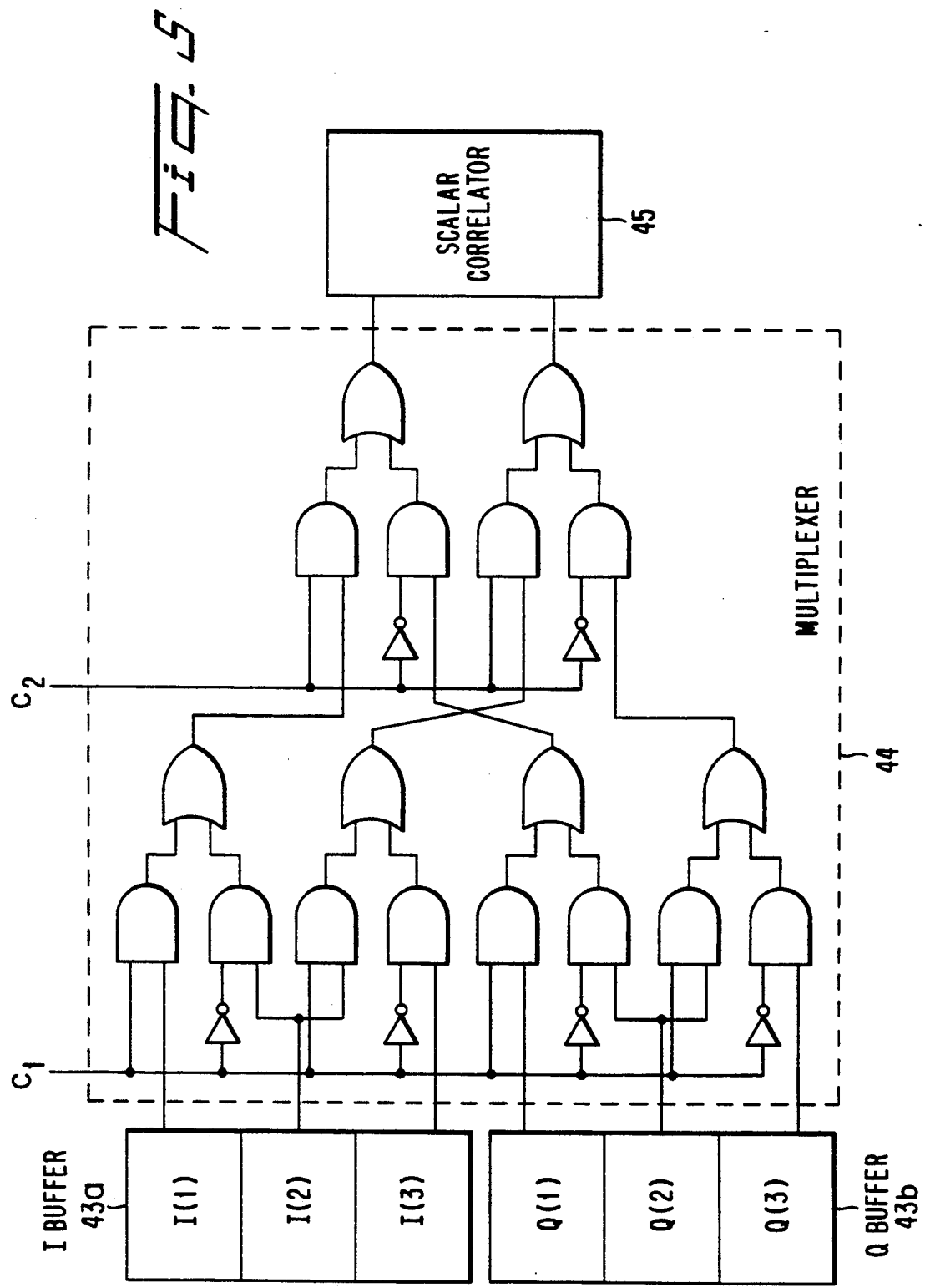

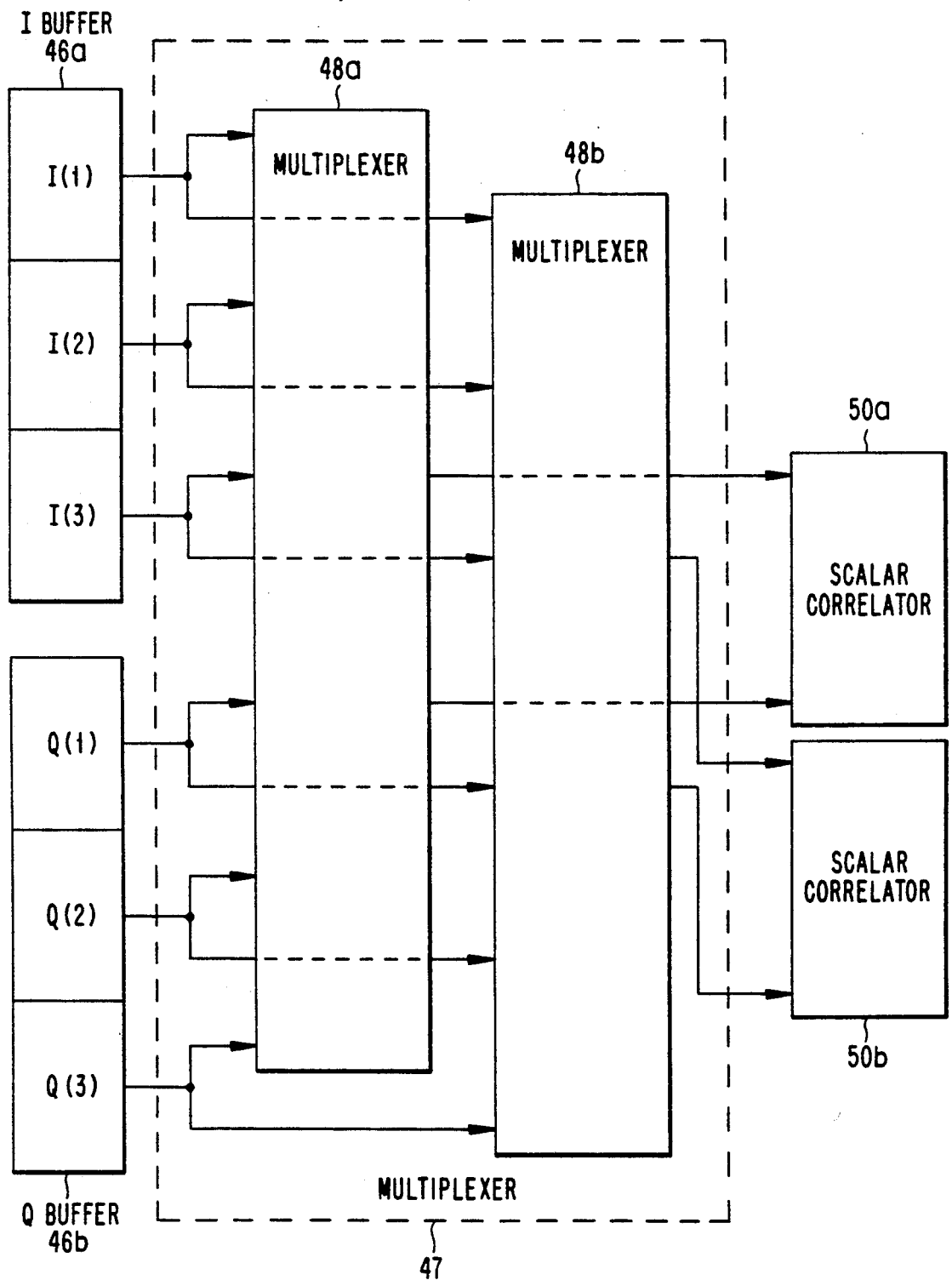

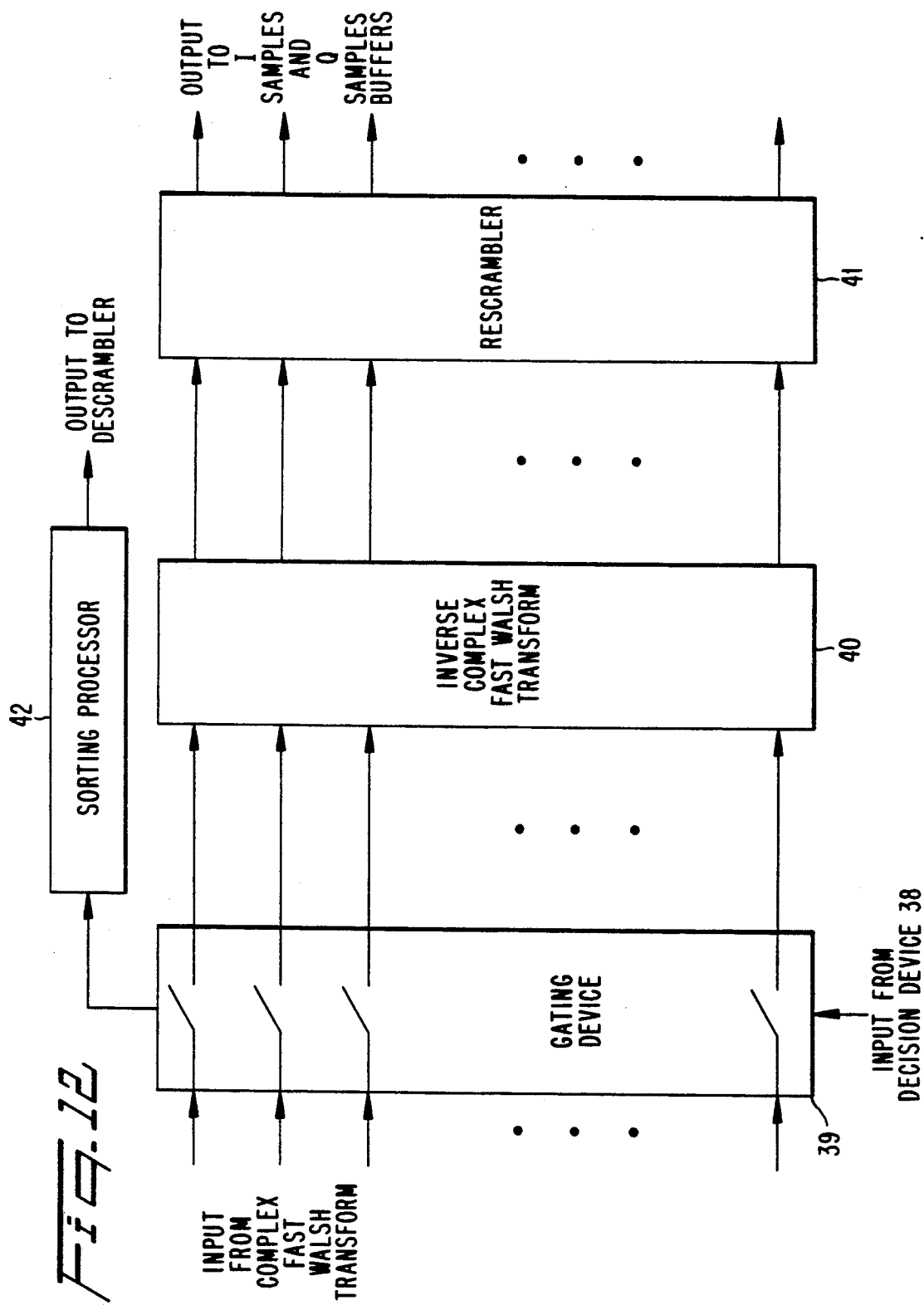

RAKE RECEIVER WITH SELECTIVE RAY COMBINING

FIELD OF INVENTION

The present invention relates to the use of Code Division Multiple Access (CDMA) communications techniques in cellular radio telephone communication systems, and more particularly, to a RAKE receiver scheme for correlating a despreading code sequence with the received signal samples to determine the received data sequences.

BACKGROUND OF THE INVENTION

CDMA or spread spectrum communications have been in existence since the days of World War II. Early applications were predominantly military oriented. However, today there has been an increasing interest in using spread spectrum systems in commercial applications. Some examples include digital cellular radio, land mobile radio, and indoor and outdoor personal communication networks.

The cellular telephone industry has made phenomenal strides in commercial operations in the United States as well as the rest of the world. Growth in major metropolitan areas has far exceeded expectations and is outstripping system capacity. If this trend continues, the effects of rapid growth will soon reach even the smallest markets. Innovative solutions are required to meet these increasing capacity needs as well as maintain high quality service and avoid rising prices.

Throughout the world, one important step in cellular systems is to change from analog to digital transmission. Equally important is the choice of an effective digital transmission scheme for implementing the next generation of cellular technology. Furthermore, it is widely believed that the first generation of Personal Communication Networks (PCNs), employing low cost, pocket-size, cordless telephones that can be carried comfortably and used to make or receive calls in the home, office, street, car, etc., will be provided by cellular carriers using the next generation digital cellular system infrastructure and the cellular frequencies. The key feature demanded in these new systems is increased traffic capacity.

Currently, channel access is achieved using Frequency Division Multiple Access (FDMA) and Time Division Multiple Access (TDMA) methods. In FDMA, a communication channel is a single radio frequency band into which a signal's transmission power is concentrated. Interference with adjacent channels is limited by the use of band pass filters which only pass signal energy within the specified frequency band. Thus, with each channel being assigned a different frequency, system capacity is limited by the available frequencies as well as by limitations imposed by channel reuse.

In TDMA systems, a channel consists of a time slot in a periodic train of time intervals over the same frequency. Each period of time slots is called a frame. A given signal's energy is confined to one of these time slots. Adjacent channel interference is limited by the use of a time gate or other synchronization element that only passes signal energy received at the proper time. Thus, the problem of interference from different relative signal strength levels is reduced.

Capacity in a TDMA system is increased by compressing the transmission signal into a shorter time slot. As a result, the information must be transmitted at a correspondingly faster burst rate which increases the amount of occupied spectrum proportionally.

With FDMA or TDMA systems or hybrid FDMA/TDMA systems, the goal is to insure that two potentially interfering signals do not occupy the same frequency at the same time. In contrast, Code Division Multiple Access (CDMA) allows signals to overlap in both time and frequency. Thus, all CDMA signals share the same frequency spectrum. In the frequency or the time domain, the multiple access signals appear to be on top of each other.

There are a number of advantages associated with CDMA communication techniques. The capacity limits of CDMA-based cellular systems are projected to be up to twenty times that of existing analog technology as a result of the properties of a wide band CDMA system, such as improved coding gain/modulation density, voice activity gating, sectorization and reuse of the same spectrum in every cell. CDMA transmission of voice by a high bit rate decoder insures superior, realistic voice quality. CDMA also provides for variable data rates allowing many different grades of voice quality to be offered. The scrambled signal format of CDMA completely eliminates cross talk and makes it very difficult and costly to eavesdrop or track calls, insuring greater privacy for callers and greater immunity from air time fraud.

In principle, in a CDMA system the informational data stream to be transmitted is impressed upon a much higher rate data stream known as a signature sequence. Typically, the signature sequence data are binary, providing a bit stream. One way to generate this signature sequence is with a pseudo-noise (PN) process that appears random, but can be replicated by an authorized receiver. The informational data stream and the high bit rate signature sequence stream are combined by multiplying the two bit streams together, assuming the binary values of the two bit streams are represented by +1 or −1. This combination of the higher bit rate signal with the lower bit rate data stream is called coding or spreading the informational data stream signal. Each informational data stream or channel is allocated a unique spreading code.

A plurality of coded information signals modulate a radio frequency carrier, for example by quadrature phase shift keying (QPSK), and are jointly received as a composite signal at a receiver. Each of the coded signals overlaps all of the other coded signals, as well as noise-related signals, in both frequency and time. If the receiver is authorized then the composite signal is correlated with one of the unique codes, and the corresponding information signal can be isolated and decoded.

One CDMA technique, called "traditional CDMA with direct spreading", uses a signature sequence to represent one bit of information. Receiving the transmitted sequence or its complement (the transmitted binary sequence values) indicates whether the information bit is a "0" or "1". The signature sequence usually comprises N bits, and each bit is called a "chip". The entire N-chip sequence, or its complement, is referred to as a transmitted symbol. The receiver correlates the received signal with the known signature sequence of its own signature sequence generator to produce a normalized value ranging from −1 to +1. When a large positive correlation results, a "0" is detected; when a large negative correlation results, a "1" is detected.

Another CDMA technique, called "enhanced CDMA with direct spreading" allows each transmitted sequence to represent more than one bit of information. A set of code words, typically orthogonal code words or bi-orthogonal code words, is used to code a group of information bits into a much longer code sequence or code symbol. A signature sequence or scramble mask is modulo-2 added to the binary code sequence before transmission. At the receiver, the known scramble mask is used to descramble the received signal, which is then correlated to all possible code words. The code word with the largest correlation value indicates which code word was most likely sent, indicating which information bits were most likely sent. One common orthogonal code is the Walsh-Hadamard (WH) code.

In both traditional and enhanced CDMA, the "information bits" referred to above can also be coded bits, where the code used is a block or convolutional code. One or more information bits can form a data symbol. Also, the signature sequence or scramble mask can be much longer than a single code sequence, in which case a subsequence of the signature sequence or scramble mask is added to the code sequence.

In many radio communication systems, the received signal includes two components, an I (in-phase) component and a Q (quadrature) component. This results because the transmitted signal has two components, and/or the intervening channel or lack of coherent carrier reference causes the transmitted signal to be divided into I and Q components. In a typical receiver using digital signal processing, the received I and Q component signals are sampled every $T_c$ seconds, where $T_c$ is the duration of a chip, and stored.

In mobile communication systems, signals transmitted between base and mobile stations typically suffer from echo distortion or time dispersion, caused by, for example, signal reflections from large buildings or nearby mountain ranges. Multipath dispersion occurs when a signal proceeds to the receiver along not one but many paths so that the receiver hears many echoes having different and randomly varying delays and amplitudes. Thus, when multipath time dispersion is present in a CDMA system, the receiver receives a composite signal of multiple versions of the transmitted symbol that have propagated along different paths (referred to as "rays") having relative time delays of less than one symbol period. Each distinguishable "ray" has a certain relative time of arrival $k\, T_c$ seconds and spans N of the I and Q chip samples, since each signal image is an N-chip sequence. As a result of multipath time dispersion, the correlator outputs several smaller spikes rather than one large spike. Each ray that is received after the symbol period (i.e., if the time delay caused by a reflection exceeds one symbol period) appears as an uncorrelated interfering signal that reduces the total capacity of the communication system. To optimally detect the transmitted symbols (bits), the spikes received must be combined. Typically, this is done by a RAKE receiver, which is so named because it "rakes" all the multipath contributions together.

A RAKE receiver uses a form of diversity combining to collect the signal energy from the various received signal paths, i.e., the various signal rays. Diversity provides redundant communication channels so that when some channels fade, communication is still possible over non-fading channels. A CDMA RAKE receiver combats fading by detecting the echo signals individually using a correlation method and adding them algebraically (with the same sign). Further, to avoid intersymbol interference, appropriate time delays are inserted between the respective detected echoes so that they fall into step again.

In one for of RAKE receiver, correlation values of the signature sequence with the received signals at different time delays are passed through a delay line that is tapped at expected time delays (dt), the expected time between receiving echoes. The outputs at the RAKE taps are then combined with appropriate weights. Such a receiver searches for the earliest ray by placing a tap at $T_o$, and for a ray delayed by dt by placing a tap at $T_o+dt$, and so forth. The RAKE tap outputs having significant energy are appropriately weighted and combined to maximize the received signal to noise and interference ratio. Thus, the total time delay of the delay line determines the amount of arrival time delay that can be searched.

A diagram of a conventional RAKE receiver using post-correlator, coherent combining of different rays is shown in FIG. 1. A received radio signal is demodulated by, for example, mixing it with cosine and sine waveforms and filtering the signal in an RF receiver 1, yielding I and Q chip samples. These chip samples are buffered by a buffer which is composed of two buffers, one for the I (in-phase) samples $2a$ and one for the Q (quadrature) samples $2b$. The bottom of each buffer $2a$ and $2b$ contains the most recently received chip samples in time.

A multiplexer 3 receives the buffered chip samples and sends complex correlators $4a$ and $4b$ a range of I chip samples and the same range of Q chip samples. The range selected includes N samples corresponding to the N-chip sequence arriving at a certain time. For example, if the I and Q buffers $2a$ and $2b$, respectively, contain 159 chip samples (0–158), and N is 128, then the multiplexer 3 would send chip samples i through $(i+127)$ from the I buffer $2a$, and chip samples i through $(i+127)$ from the Q buffer $2b$ to correlator $4a$, where i is the discrete time index of the signal rays from when the buffers were first filled.

A complex correlation value is formed by each complex correlator $4a$ and $4b$ which correlate two sets of signal samples, I and Q, to the known signature sequence (code). Different complex correlators correspond to different received sample ranges, and hence different signal rays. The multiplexer 3 can provide the received samples either serially or in parallel.

In general, a complex correlator correlates a complex input stream (I+jQ samples) to a complex known sequence, producing a complex correlation value. If the signature sequence is not complex, each complex correlator can be implemented as two scalar correlators in parallel, which is defined as a "half-complex" correlator. If the signature sequence is complex, the complex correlators correlate a complex input to a complex sequence, giving rise to "full-complex" correlators. It is to be understood that the term "complex correlator" will be used herein to refer to each of the aforementioned scenarios.

Following correlation, the complex correlation values are transmitted to multiplier 5 where they are multiplied by a complex weight referred to as a complex RAKE tap. Each RAKE tap is a complex number consisting of a real part and an imaginary part. The complex correlator $4a$ correlates a set of data to a known signature sequence. Typically, only the real part of the product of the complex correlation values and the RAKE tap values are sent to accumulator 6. The accumulator 6 sums the weighted correlation results for all the signal rays processed and sends the accumulated result to a threshold device 7. The threshold device 7 detects a binary "0" if the input is greater than a threshold, or a binary "1" if the input is less than the threshold.

In mathematical terms, suppose $X(n)=I(n)+jQ(n)$ are the chip samples received by the receiver, where $I(n)$ are the I component samples, $Q(n)$ are the Q component samples, and n is the chip sample index corresponding to a respective discrete time. In FIG. 1, $I(n)$ are stored in 2a and $Q(n)$ are stored in 2b. The multiplexer 3, selects a range of I samples and a range of Q samples corresponding to the same ray. If $M(k,n)=M_I(k,n)+jM_Q(k,n)$ is the multiplexer output for ray k, giving N samples (n=0,N−1), then $M(k,n)=X(n+k)$ and $M_I(k,n)=I(n+k)$ and $M_Q(k,n)=Q(n+k)$.

The complex correlator, 4a, correlates the range of data samples from the multiplexer 3 to a known code sequence. Consider data samples $X(k), X(k+1), \ldots, X(k+N-1)$, which are discrete time samples of the received data. If the receiver is trying to detect a code sequence $C(0), C(1), \ldots C(N-1)$, which consists of N values (usually ±1 values), the correlator correlates some set of N data values with the N code sequence values as follows:

$$R(k) = X(k)C(0) + X(k + 1)C(1) + \ldots + X(k + N - 1)C(N - 1) = \sum_{n=0}^{N-1} X(n + k)C(n)$$

where the index k indicates where to start in the data sequence. This corresponds to a relative time of arrival of the signal. Different arrival times correspond to different signal rays. Thus, ray k corresponds to a range of data values needed: $\{X(k),X(k+1),\ldots,X(k+N-1)\}$. If N is large, then rays k and k+1 correspond to ranges which substantially overlap. The computation of R(k) can be performed by accessing the input data range in parallel or serially. FIG. 2 is representative of a parallel approach. A data buffer 53 stores consecutive time samples of the received signal, X(n). Multiplexer 54 selects a range of N data values, $\{X(k),X(k+1),\ldots, X(k+N-1)\}$, which are sent to the correlator 55. A multiplier 56 which corresponds to each input to the correlator, multiplies each input value with a corresponding coding sequence value. The products are summed together in adder 57 to form the correlation value R(k).

FIG. 3 is representative of accessing the input range serially to compute R(k). Input buffer 58 stores the received data samples. The buffer may be only one sample long, since only one sample at a time is correlated. If the buffer is more than one sample long, then a multiplexer 59 is needed to select a particular sample $X(k+i)$, where i is determined by control processor 60. The value selected is sent to correlator 61. The correlator 61 first computes the product of the input $X(k+i)$ with one element of the code sequence, C(i), using multiplier 62. This product is then added to an accumulator 64 which stores past products. Accumulator 64 is originally set to zero, then i is stepped from 0 to N−1, allowing the accumulation of N products. After N products have been accumulated, they are output from the correlator giving correlation value R(k). Whether performing the correlation in parallel or serially, each data value X(n) consists of b bits. The bits can be accessed and used all at once (parallel computation) or one at a time (bit serial approach).

Regardless of the correlation approach used, the correlator 4a for ray k correlates the multiplexer output M(k,n) to the real code sequence C(n), producing a complex correlation value $R(k)=R_I(k)+jR_Q(k)$ where:

$$R(k) = \sum_{n=0}^{N-1} M(k,n)C(n)$$

and $$R_I(k) = \sum_{n=0}^{N-1} I(n + k)C(n)$$

$$R_Q(k) = \sum_{n=0}^{N-1} Q(n + k)C(n)$$

The RAKE combiner uses RAKE taps $W(k)=W_I(k)+jW_Q(k)$ to multiply the correlation values and accumulate the result into the decision statistic, Z where:

$$Z = \sum_{\substack{k \\ W(k)\neq 0+j0}} Re\{W(k)R^*(k)\} = \sum_{\substack{k \\ W(k)\neq 0+j0}} W_I(k)R_I(k) + W_Q(k)R_Q(k)$$

The quantity Z is then thresholded in the threshold device 7 to determine whether a "0" or "1" was sent.

The conventional RAKE receiver is designed based on the assumption that for a given signal ray, there is signal energy in both the I and Q channels. In practice, this is not always the case. If all or most of the energy for a given signal ray is on the I channel then correlating both the I and Q channel is inefficient. This results in inefficient use of processing time, which might be better used elsewhere in the receiver. For a required level of performance, the conventional RAKE receiver requires more processing time than necessary. If processing time is limited, then a loss in utilized received signal power results, giving a loss in performance, i.e., increased detection errors.

The following example shows how the conventional RAKE receiver functions under two different scenarios. Suppose there are four signal rays, one line-of-sight ray and three echoes, which are combined with the complex weights (referred to as RAKE taps) given in TABLE 1.

TABLE 1

| signal ray | amplitude | angle (deg) | I RAKE tap | Q RAKE tap |
|---|---|---|---|---|
| 0 | 0.625 | 70 | 0.214 | 0.587 |
| 1 | 0.5 | 30 | 0.433 | 0.250 |
| 2 | 0.4677 | 40 | 0.358 | 0.301 |
| 3 | 0.375 | 10 | 0.369 | 0.065 |

The amplitude and angle represent the polar form of the RAKE taps, and the I and Q taps provide the Cartesian form used to multiply I and Q respectively. The energy in each signal ray is given by the amplitude squared or by the sum of the I RAKE tap squared and Q RAKE tap squared. The amplitudes have been normalized so that the total signal power (sum of the amplitudes squared) is unity.

In the first scenario, suppose the RAKE receiver is limited to two RAKE taps, which would be used to combine the two strongest rays, rays 0 and 1. The energy in rays 2 and 3 would not be used in the detection process. The total signal power RAKE'd in would be $0.625^2 + 0.5^2 = 0.214^2 + 0.587^2 + 0.433^2 + 0.250^2 = 0.64$ or 64% of the total signal power. An objective of the present invention is to increase the signal power used in the detection process, resulting in an increase in system performance.

In a second scenario, assume that the RAKE receiver is required to provide a certain performance level, which corresponds to RAKing in a certain percentage level of the signal energy, for example 75%, during detection. With a conventional RAKE receiver, it is necessary to process three of the four rays. This requires a certain amount of computation, which corresponds to either a certain amount of hardware (three complex correlators) or a certain amount of processing time (one complex correlator used three times). Another objective of the present invention is to achieve the same system performance level with less computation, which corresponds to either less hardware or less processing time which is later discussed herein.

SUMMARY OF THE INVENTION

The present invention solves the above-mentioned problems using a modified form of the RAKE receiver, referred to herein as a WRAKE receiver wherein the I and Q components are treated independently and the I and Q taps from different rays are processed simultaneously. The WRAKE receiver includes means for receiving a composite signal of overlapping transmitted modulated carrier signals including at least two rays and for demodulating the composite signal to recover the transmitted symbols in each ray, means for sampling in-phase (I) and quadrature (Q) signals for each ray to produce I and Q samples for each transmitted symbol, means for selecting different groups of samples, each group including I or Q samples from one of said rays, means for correlating the grouped samples with known code sequences to generate correlation values, means for combining the correlation values and means to compare the combined correlation values with a threshold to determine each data symbol corresponding to each transmitted symbol. In one preferred embodiment only two groups of samples are selected where one group includes I samples and the other group includes Q samples.

In preferred embodiments the following can be used as correlation means: a single complex correlator, a set of complex correlators, a single scalar correlator and a set of scalar correlators. In another embodiment a means for computing a fast Walsh transform is used to correlate a set of known code sequences with the samples. A single code sequence can be non-orthogonal, orthogonal or bi-orthogonal with other code sequences associated with the same receivers or other receivers.

A further embodiment employs the RAKE receiver in a subtractive CDMA system. A descrambler is used to descramble each sample and then the correlation means correlates the descrambled samples with the code sequences. A detection means detects the received code sequence. The detected signal is then subtracted from the composite signal leaving a residual composite signal which, if subtracted in the correlation domain, is inverse correlated and rescrambled to produce the original composite signal less the detected signal. The residual composite signal is then recursively decoded until all the information signals have been extracted from the composite signal.

BRIEF DESCRIPTION OF THE DRAWINGS

The features and advantages of the invention will become apparent from reading the following detailed description in conjunction with the drawings, in which:

FIG. 2 is functional schematic of an exemplary parallel correlator;

FIG. 3 is functional schematic of an exemplary serial correlator;

FIG. 4 is a functional schematic of an embodiment of a WRAKE receiver according to the present invention;

FIG. 5 is a functional schematic of an embodiment of the multiplexer operation according to the present invention;

FIG. 6 is a functional schematic of another embodiment of the multiplexer operation according to the present invention;

FIG. 12 is a functional schematic including further elements of the FIG. 11 embodiment.

DETAILED DESCRIPTION OF THE PREFERRED EMBODIMENTS

While the following description is in the context of cellular communications systems involving portable or mobile radio telephones and/or personal communication networks, it will be understood by those skilled in the art that the present invention may be applied to other communications applications.

The present invention, referred to as a WRAKE receiver, combines signal energy in a manner different from conventional RAKE receivers. Rather than treating the signal energy components as signal rays with I and Q components, the WRAKE receiver treats the components at a lower level, referred to as "waves", where each wave has a signal ray number and a channel specification (I or Q).

For example, the strongest wave in the aforesaid TABLE 1 example is on signal ray 0, the Q channel (having weight 0.587). Shown in TABLE 2 are the waves in decreasing energy order for the example in TABLE 1.

TABLE 2

WRAKE View of Signal Components

| wave | signal ray | channel | weight |
|------|------------|---------|--------|
| 0 | 0 | Q | 0.587 |
| 1 | 1 | I | 0.433 |
| 2 | 3 | I | 0.369 |
| 3 | 2 | I | 0.358 |
| 4 | 2 | Q | 0.301 |
| 5 | 1 | Q | 0.250 |
| 6 | 0 | I | 0.214 |
| 7 | 3 | Q | 0.065 |

Figure 1:
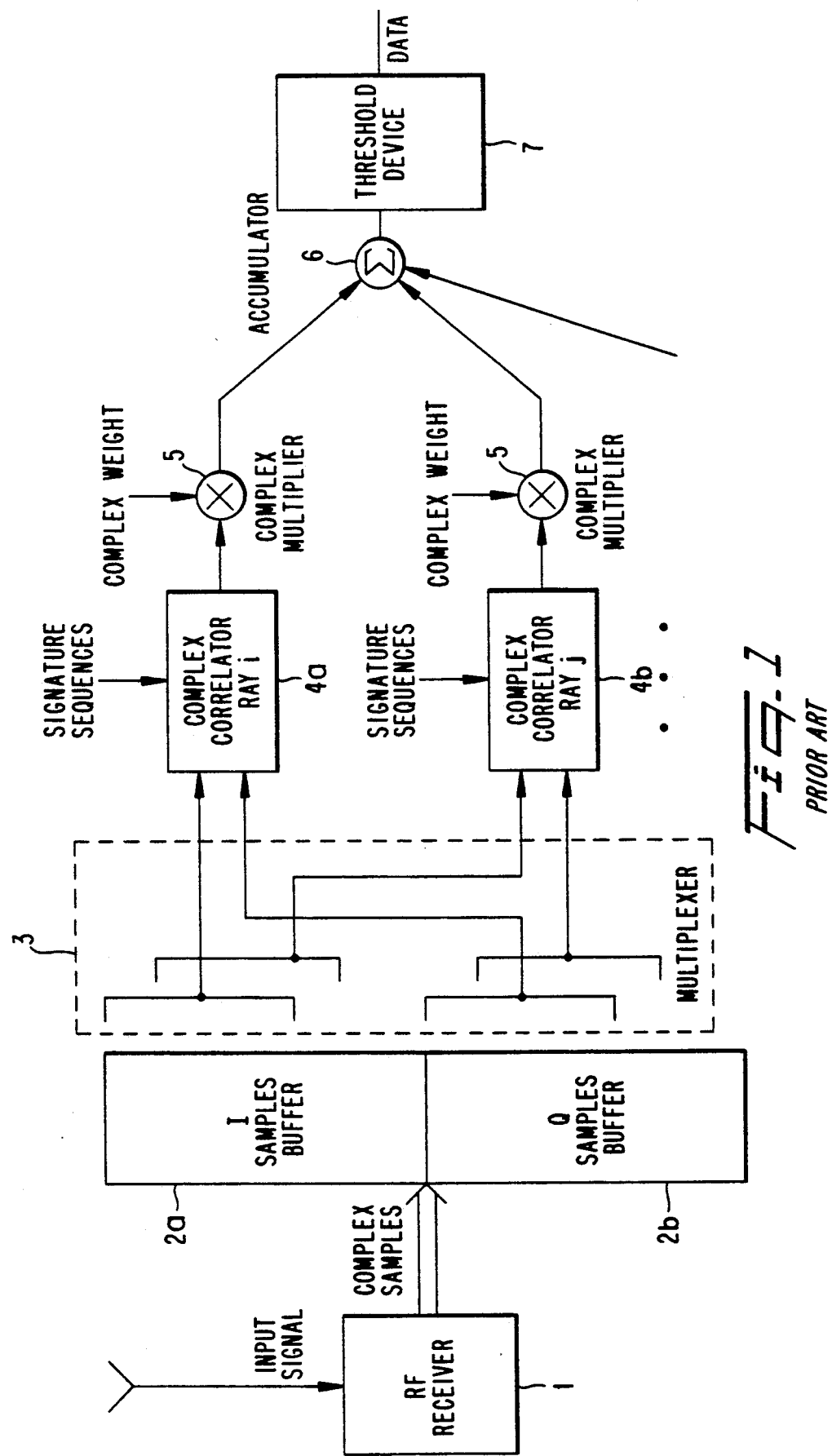
FIG. 1 is a functional schematic of a conventional RAKE receiver.

When combining signal energy components at the wave level, one strategy is to combine waves containing the most signal energy. Since there are twice as many waves as there are rays, this approach might appear inefficient. However, because a complex correlator can perform two correlations in parallel, two waves can be processed together in the same complex correlator. Unlike the conventional RAKE receiver of FIG. 1, these waves need not come from the same signal ray (i.e., the waves processed together can arrive at different times) and these waves do not have to come from two different channels (i.e., they could both be from either the I or Q channel). A pair of waves processed by the same complex correlator is defined as a "wray".

The present invention processes the waves which contain the most signal energy. For example, the strongest wave can be processed with the next strongest wave in the same complex correlator, etc. This particular method of WRAKE pairing need not be used, so long as the strongest waves are processed. TABLE 3 shows the aforementioned method of pairing where the strongest wave is processed with the next strongest wave. Each pair is referred to as a "wray".

TABLE 3

WRAKE Pairing

| signal "wray" | first component | second component |
|---------------|-----------------|------------------|
| 0 | wave 0 | wave 1 |
| 1 | wave 2 | wave 3 |
| 2 | wave 4 | wave 5 |
| 3 | wave 6 | wave 7 |

In the example used, the conventional RAKE limited to two complex correlations processed 64% of the signal energy. The WRAKE receiver, also limited to two complex correlations, would process "wrays" 0 and 1. Thus, the total signal energy included would be (see TABLEs 2 and 3) $0.587^2 + 0.433^2 + 0.369^2 + 0.358^2 = 0.796$ or 79.6% of the total signal power. Thus, for this example, the increase over the conventional system in signal energy collected is 15.6% of the total energy available. There are other examples which can be constructed where the increase in signal energy collected is even greater. Thus, when the number of complex correlations performed is limited, the WRAKE receiver collects more of the signal energy, providing better receiver performance.

With the same example, suppose a performance requirement determines the number of complex correlations performed. If the performance requirements of the system results in the requirement that 75% of the signal energy be collected, the performance criterion is met with only two complex correlations. Actually in this example, the WRAKE receiver collects 79% of the energy with only two complex correlations. As a result, there is either a reduction in hardware or processing time over the conventional RAKE receiver which requires three complex correlations to meet the performance criterion.

The mathematical value of the decision statistic Z from the discussion of the conventional RAKE can be manipulated to distinguish the conventional RAKE and the WRAKE of the present invention. From the conventional RAKE:

$$Z = \sum_{\substack{k \\ W(k) \neq 0 + j0}} Re\{W(k)R^*(k)\} =$$

$$\sum_{\substack{k \\ W(k) \neq 0 + j0}} W_I(k)R_I(k) + W_Q(k)R_Q(k)$$

The expression is equivalent to:

$$Z = \sum_{\substack{k \\ W(k) \neq 0 + j0}} W_I(k)R_I(k) + \sum_{\substack{k \\ W(k) \neq 0 + j0}} W_Q(k)R_Q(k)$$

Some of the component taps in each summation may be zero or quantized to zero since $W(k) \neq 0 + j0$ means that at least one component of $W(k)$ is nonzero, but not necessarily both. Computing the corresponding correlation value would be a waste of computation resources, since it would then be multiplied by zero. Accordingly for the WRAKE receiver, only component correlations which are weighted by nonzero component tap values are computed. When the RAKE receiver is limited to a certain number of RAKE taps, L, there is a limitation on the number of rays that can be combined in the conventional RAKE. To optimize performance, the L rays with the highest RAKE tap magnitudes or magnitudes squared are used. If $k^i$, where $i = 0, \ldots, L-1$ correspond to these rays then Z for a conventional RAKE is:

$$Z = \sum_{i=0}^{L-1} W_I(k^i)R_I(k^i) + \sum_{i=0}^{L-1} W_Q(k^i)R_Q(k^i)$$

$$= \sum_{i=0}^{L-1} W_I(k^i)R_I(k^i) + W_Q(k^i)R_Q(k^i)$$

The WRAKE receiver combines more signal energy in two ways. First, the same ray for each component combined in parallel does not have to be used, and, second, different components (I and Q) in parallel need not be combined. For example, when $i = 1$ in the previous summation, the WRAKE receiver could combine ray 1, I component with ray 2, I component. Mathematically, the WRAKE receiver forms:

$$Z = \sum_{i=0}^{L-1} W_{c1}(k_1^i)R_{c1}(k_1^i) + W_{c2}(k_2^i)R_{c2}(k_2^i)$$

where $c_1^i$ and $c_2^i$ represent which component, I or Q, $k_1^i$ and $k_2^i$ represent which ray, and i indicates which "wray". Unlike the conventional RAKE, $c_1^i$ and $c_2^i$ do not have to be different and $k_1^i$ and $k_2^i$ do not have to be the same. In the conventional RAKE, Z consisted of a sum of ray contributions, corresponding to a particular ray index k and a pair of different components I and Q. The WRAKE however, combines "wrays", each consisting of two components $c_1$ and $c_2$ not necessarily different and associated rays $k_1$ and $k_2$ not necessarily the same.

The present invention will now be described with reference to a block diagram shown in FIG. 4. Like the conventional RAKE receiver, a radio signal is received by a receiver 11 and sampled, producing chip samples I(n) and Q(n). These chip samples are buffered in a buffer, which can be viewed as two buffers, one for I(n) samples 12a, and one for Q(n) samples 12b.

The buffered chip samples are passed to a multiplexer 13. The multiplexer 13 selects two independent ranges of chip samples. The chip samples selected can come from the same or different channels. Let $M(k_1, c_1, k_2, c_2, n)$ denote the output of multiplexer 13 for a "wray", consisting of two sample ranges, one from component $c_1$ one from component $c_2$, where $c_1$ is either I or Q and $c_2$ is either I or Q. All four combinations, (I,I), (I,Q), (Q,I), and (Q,Q), of $c_1$ and $c_2$ are possible. However, some combination are nonsensical. For example, if $c_1 = c_2$, it does not make sense for $k_1 = k_2$ because this result would correspond to RAKing in the same signal energy twice. The range of samples from component $c_1$ corresponds to ray $k_1$ and the range from component $c_2$ corresponds to ray $k_2$. The values of $k_1$ and $k_2$ are not necessarily the same. The output of the multiplexer is given by:

$$M(k_1^i, c_1^i, k_2^i, c_2^i, n) = c_1^i(n + k_1^i) + jc_2^i(n + k_2^i)$$

The multiplexer outputs are correlated to a known sequence in complex correlators 14a and 14b. For a "wray" i, the output of correlator 14a is:

$$R_{c1}(k_1^i) + jR_{c2}(k_2^i) = \sum_{n=0}^{N-1} M(c_1^i, k_1^i, c_2^i, k_2^i, n) C(n)$$

The output of the correlators 14a and 14b are multiplied by complex weights in multipliers 15. Typically, only the real part of the product is needed, which can be obtained by two scalar multipliers and an adder. This is referred to as a "half-complex" multiplier. However, there are cases where a true complex multiplier, referred to as a "full-complex" multiplier, is needed. For example, if two signals are sent on carriers with a phase difference of ninety degrees, they can be demodulated together if a full-complex multiplier is used. It is to be understood that the term complex multipliers when used herein is referring to either half-complex or full-complex multipliers. Another possibility is that the code sequence is complex, which corresponds to the case where the I channel signature sequence and the Q channel signature sequence are different. In this case $C^*(n)$ should be used in the equation for the correlator output above.

Next the products are sent to an accumulator 16 where they are accumulated. The accumulated result is:

$$Z = \sum_{\substack{i \\ W_{c1}(k_1^i) + jW_{c2}(k_2^i) \neq 0 + j0}} Re\{(W_{c1}(k_1^i) +$$

$$jW_{c2}(k_2^i))(R_{c1}(k_1^i) - jR_{c2}(k_2^i))\}$$

or $$Z = \sum_{\substack{i \\ W_{c1}(k_1^i) + jW_{c2}(k_2^i) \neq 0 + j0}} W_{c1}(k_1^i) R_{c1}(k_1^i) +$$

$$W_{c2}(k_2^i) R_{c2}(k_2^i)$$

The decision statistic Z is passed to a threshold decision device 17 which determines the received binary information bit by comparing the accumulated result with a predetermined threshold.

In general, all the correlations can be performed in parallel (as shown in FIG. 4) or in series, using the same correlators more than once. The number and type (complex versus scalar) of correlators available determines the number of received sample ranges the multiplexer must provide (one set per "wave" correlated). Thus, the multiplexer of the WRAKE receiver must provide one range of data values (a single scalar correlator), two ranges of data values (a single complex correlator or two scalar correlators), or more (more than two scalar correlators or more than one complex correlator) ranges of data values from the data buffer to the correlator(s). An increase in the ranges in parallel is accompanied by an increase in circuitry needed for the multiplexer.

If only one range is required, for example when a single scalar correlator is used, then the multiplexer is straightforward. A simple example of this embodiment is shown in FIG. 5 where each channel buffer is three samples long, and the range of samples required (i.e., the length of the information sequence to which the data are being correlated) is two. If the three complex samples are represented by $I(n) + jQ(n)$, where n is the discrete time index, there are four possible ranges of data values: I(1) through I(2), I(2) through I(3), Q(1) through Q(2), and Q(2) through Q(3). These values are stored by channel in buffers 43a and 43b. One of the four possible ranges is selected by the multiplexer 44 where control bits $c_1$ and $c_2$ select the starting time and the channel respectively. The selected range is then sent to scalar correlator 45.

There are several ways to provide more than one range, not necessarily from different channels. For example, if all multiplexer outputs are provided in parallel, then one "brute force" method for providing more than one range is to duplicate the multiplexer of FIG. 5, as shown in FIG. 6. The data buffers 46a and 46b are connected to the multiplexer 47 which includes multiplexers 48a and 48b, each providing a different range of possibly overlapping data values. The two ranges of data values are sent to two different scalar correlators 50a and 50b.

The total number of correlations performed depends on the number of wrays which is related to the number of echoes. As the receiver moves with respect to the transmitter, the number of waves will vary and hence the number of correlations actually performed will vary with time. For example, during one time period a single wave might be processed while during a different time period multiple waves may be processed.

The WRAKE receiver can be adapted to other forms of channel diversity. For example, if antenna diversity is present, then there would be multiple I and Q channels. The WRAKE would still process the strongest waves, independently of the signal ray, I/Q channel, and antenna from which the waves originated. Also, by using full-complex multipliers instead of half-complex multipliers, the WRAKE receiver can demodulate in parallel two signals whose carriers are separated by ninety degrees. Other forms of channel diversity include, but are not limited to, frequency diversity (sending the same message on different frequency channels), time diversity (sending the same message at different times), explicit path or space diversity (sending the message purposely on different paths, usually using different transmitting and/or receiving antennas), and polarization diversity.

An alternate preferred embodiment replaces the multiple correlators shown in FIG. 4 with one complex correlator. In this configuration, the single complex correlator is used multiple times, and the results are accumulated. As compared to a conventional receiver, if the single complex correlator is used the same number of times, the complex correlator of the WRAKE would process more signal energy than the conventional RAKE. Thus, for a given performance level the WRAKE uses the single complex correlator fewer times, saving processing time.

In the discussion above, the WRAKE receiver is configured to process pairs of ranges either in parallel or in series. If scalar correlators are used (scalar sample by sample multipliers in the pre-filtering WRAKE case), then ranges are actually processed one at a time, allowing for the total number of processed ranges to be even or odd. Thus, if the number of waves is odd, the number of ranges processed exactly equals the number of waves. If the WRAKE receiver is configured to process pairs of ranges, and the number of waves is odd, then the last wave could be paired with an arbitrary range to complete a "wray", and the weight associated with the arbitrary range would be set to zero. In general, the WRAKE receiver can be configured to process J ranges of data in parallel, possibly allowing results from multiple sets of J ranges to be accumulated. If the number of waves is not a multiple of J, then either extraneous processing elements are fed with zeroes, or they are fed with arbitrary ranges, whose results are weighted by zero.

Limited WRAKE

Figure 7:
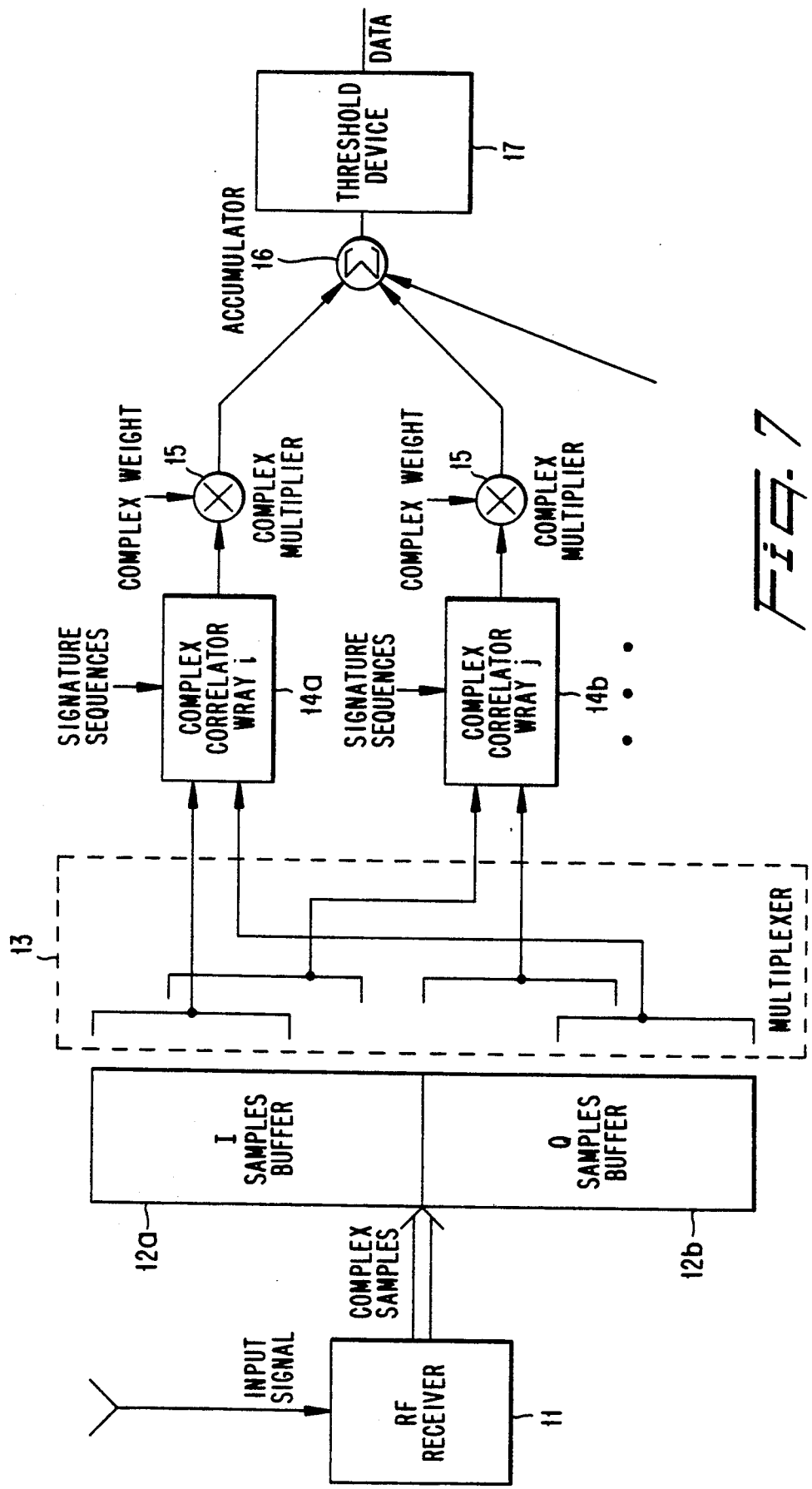
FIG. 7 is a functional schematic of a further embodiment of a WRAKE receiver according to the present invention.

Another preferred embodiment of the present invention called a limited WRAKE receiver is shown in FIG. 7. Like elements in FIG. 7 function the same as the elements in FIG. 4 except as mentioned below. The limited WRAKE receiver differs from a regular WRAKE receiver because the complex correlator of a limited WRAKE receiver must receive a range of I values and a range of Q values. The ranges are still independent, but in contrast to the WRAKE receiver, the two ranges in a limited WRAKE receiver must come from different channels. The multiplexer 13 still selects independent ranges from the I and Q channels as shown in FIG. 7.

The limited WRAKE receiver processes the strongest I waves and the strongest Q waves, but the I waves must be paired with Q waves. Following the example discussed above, TABLE 4 shows the results of pairing the strongest I wave with the strongest Q wave, and so on.

TABLE 4

| | Limited WRAKE pairing | |
|---|---|---|
| signal "wray" | I component | Q component |
| 0 | wave 1 | wave 0 |
| 1 | wave 2 | wave 4 |
| 2 | wave 3 | wave 5 |
| 3 | wave 6 | wave 7 |

Processing the two strongest "wrays" yields $0.433^2+0.587^2+0.369^2+0.301^2=0.759$ or 75.9% of the total signal energy. In this example, the limited WRAKE receiver provides 11.9% more signal energy than the conventional RAKE receiver. Also, to meet a performance criterion of 75%, the signal energy processed by the limited WRAKE receiver requires only two complex correlations. Thus, the limited WRAKE is still an improvement over the conventional RAKE receiver.

One of the motivations for the limited WRAKE approach is that the multiplexers become simpler, particularly if only one complex correlator, i.e., two scalar correlators, is used. In this case, two standard multiplexers are required, one for the I channel and one for the Q channel. The control of each is independent, allowing independent ranges of values to be selected.

Figure 8:
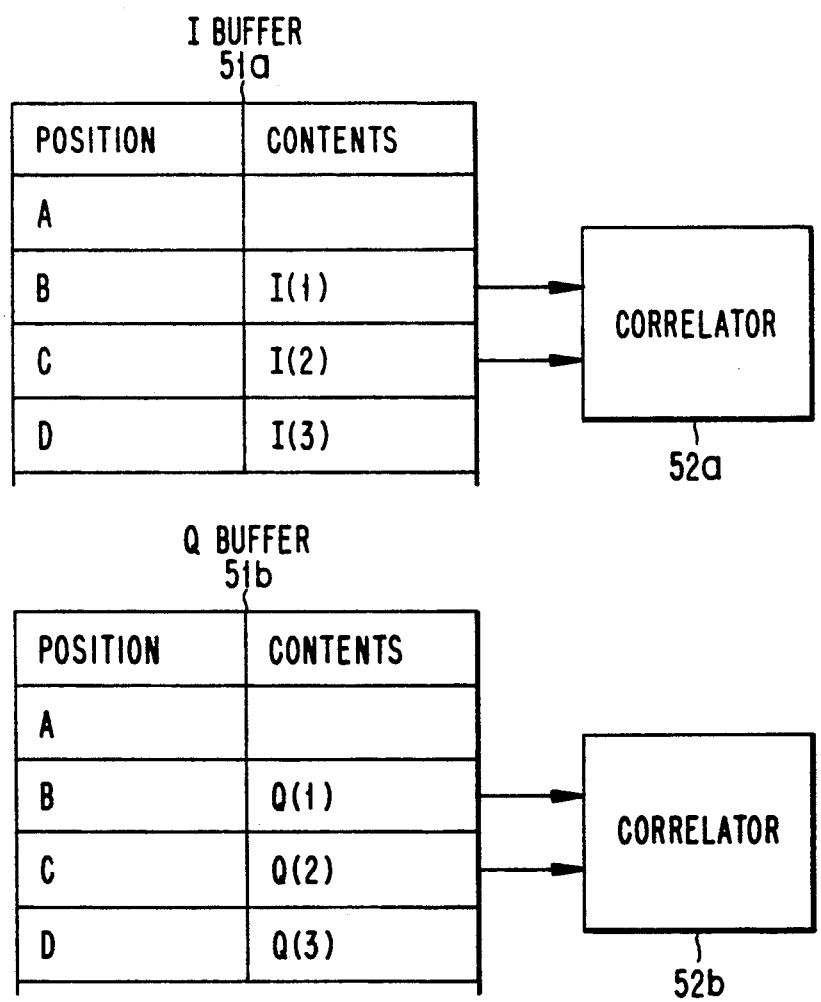
FIG. 8 is a functional schematic of another embodiment of the multiplexer operation of the present invention.

Another method to multiplexing, particularly useful in the limited WRAKE approach, uses the input buffer to provide range selection as shown in FIG. 8. The I and Q data buffers are independent shift registers, shifting the data into position for access by a set of connections to a fixed range of data buffer locations. The I and Q buffers 51a and 51b are such shift registers. When a single shift upwards is commanded, the contents in position D move to position C, the contents in position C move to position B, and so forth. With the contents shown in FIG. 8, the range I(1) through I(2) is selected for correlation as is the range Q(1) through Q(2). To select different ranges, say, I(2) through I(3) and Q(1) through Q(2), the I buffer would be shifted upwards once and the Q buffer would remain unchanged.

Pre-filtering WRAKE

Figure 9:
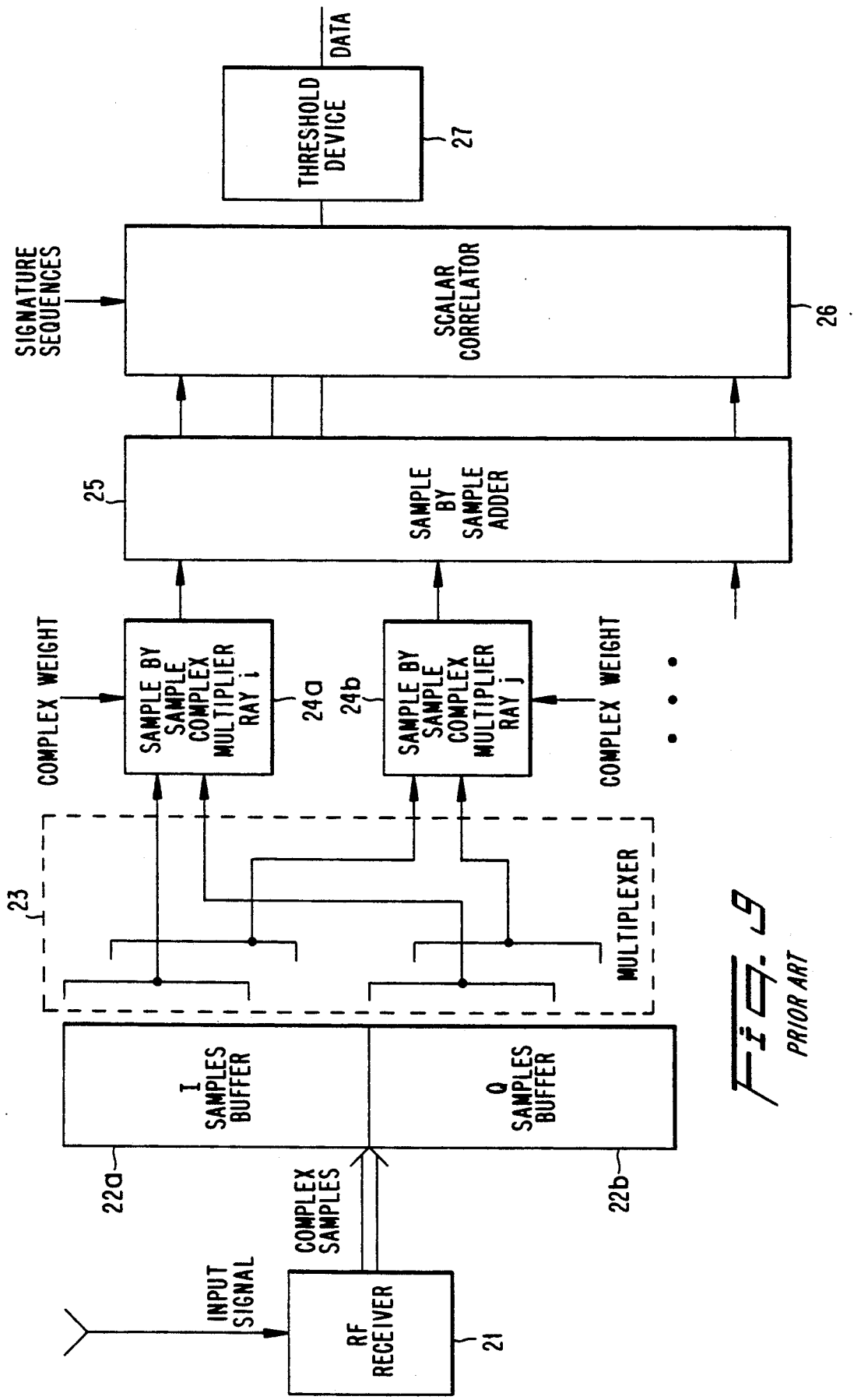
FIG. 9 is a functional schematic of a conventional RAKE receiver with prefiltering.

The order of processing the received signal in the RAKE receiver can be altered. FIG. 9 shows a conventional RAKE receiver in which the chip samples are filtered using the RAKE taps, then correlated to a known sequence. In such an implementation only one scalar correlator is needed.

Figure 10:
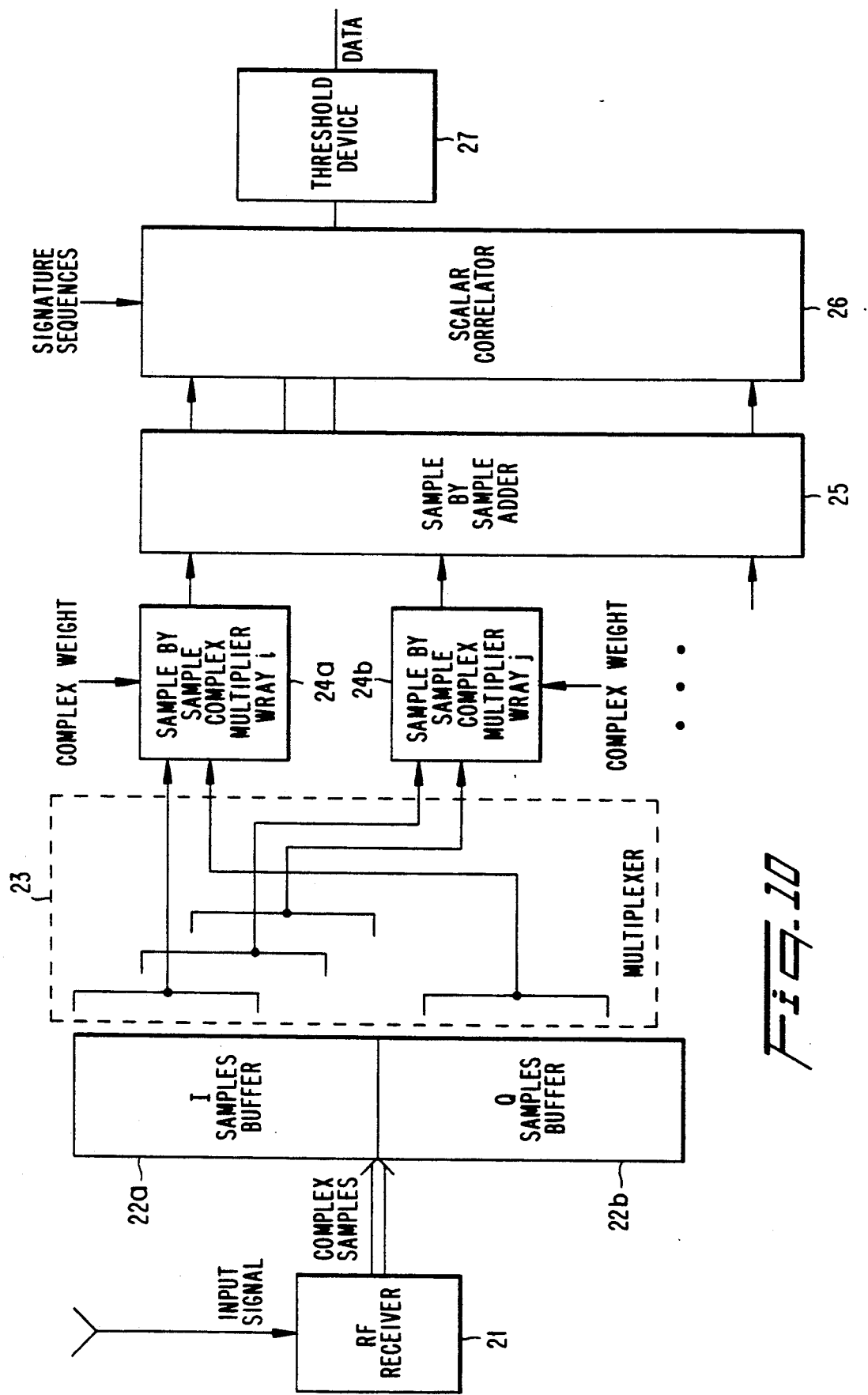
FIG. 10 is a functional schematic of an embodiment of a WRAKE receiver with prefiltering according to the present invention.

Another preferred embodiment of the present invention is a WRAKE with pre-filtering as shown in FIG. 10. A radio signal is received by the receiver 21 which produces quantized chip samples for the I and Q channels. These samples are buffered in a buffer, which can include two buffers, one for I samples 22a, and one for Q samples 22b.

The buffered chip samples are passed to a multiplexer 23. In the conventional RAKE receiver with pre-filtering of FIG. 9, the multiplexer 23 provides the sample by sample multiplier 24 with a range of I values and the same range of Q values. The multiplier 24 can include a series of sample by sample multipliers as shown in FIG. 9 or simply a single sample by sample multiplier used multiple times. The multiplier 24 takes each sample I+jQ and multiplies it by a complex weight, computing only the real part of the product. Thus, if the input to the multiplier is N I samples and N Q samples, the output is N scalar samples.

In the WRAKE receiver shown in FIG. 10, the multiplexer 23 provides one range of I or Q values and another range of I or Q values to the sample-by-sample multiplier 24. The multiplier multiplies each chip sample by a complex weight, computing either the full-complex product or only the real part of the product. If only the real part of the product is required, then the complex sample-by-sample multiplier can be implemented as two scalar sample-by-sample multipliers followed by an accumulator. If only one scalar sample-by-sample multiplier is available, then it can be used twice to realize the product. The accumulator function can be provided by the adder 25.

The sample-by-sample adder 25 adds the results from multiple sample-by-sample multipliers of multiplier 24 and passes the result to scalar correlator 26. If a single sample-by-sample multiplier is used multiple times, then the sample-by-sample adder accumulates the results before passing them on to the scalar correlator 26. The scalar correlator 26 correlates the result with a known signature sequence. The correlation result is sent to a threshold decision device 27. The threshold decision device 27 compares the correlated result with a threshold to determine the data sent. If the sample-by-sample complex multipliers 24a and 24b produce complex outputs, then 26 would be a complex correlator, correlating the real samples to one sequence and the imaginary samples to another sequence (e.g., for detection of two signals simultaneously, where the two signals were transmitted with carriers ninety degrees apart).

Several advantages are realized by the prefiltered WRAKE receiver of the present invention. For example, with a fixed number of sample-by-sample complex multipliers, the WRAKE collects more signal energy than the conventional RAKE. Also, with a fixed performance level, the WRAKE requires fewer sample-by-sample complex multipliers. Thus, when a single sample-by-sample multiplier is used multiple times, the WRAKE receiver uses the complex multiplier fewer times, reducing processing time.

WRAKE Receiver in a Substractive CDMA System

Figure 11:
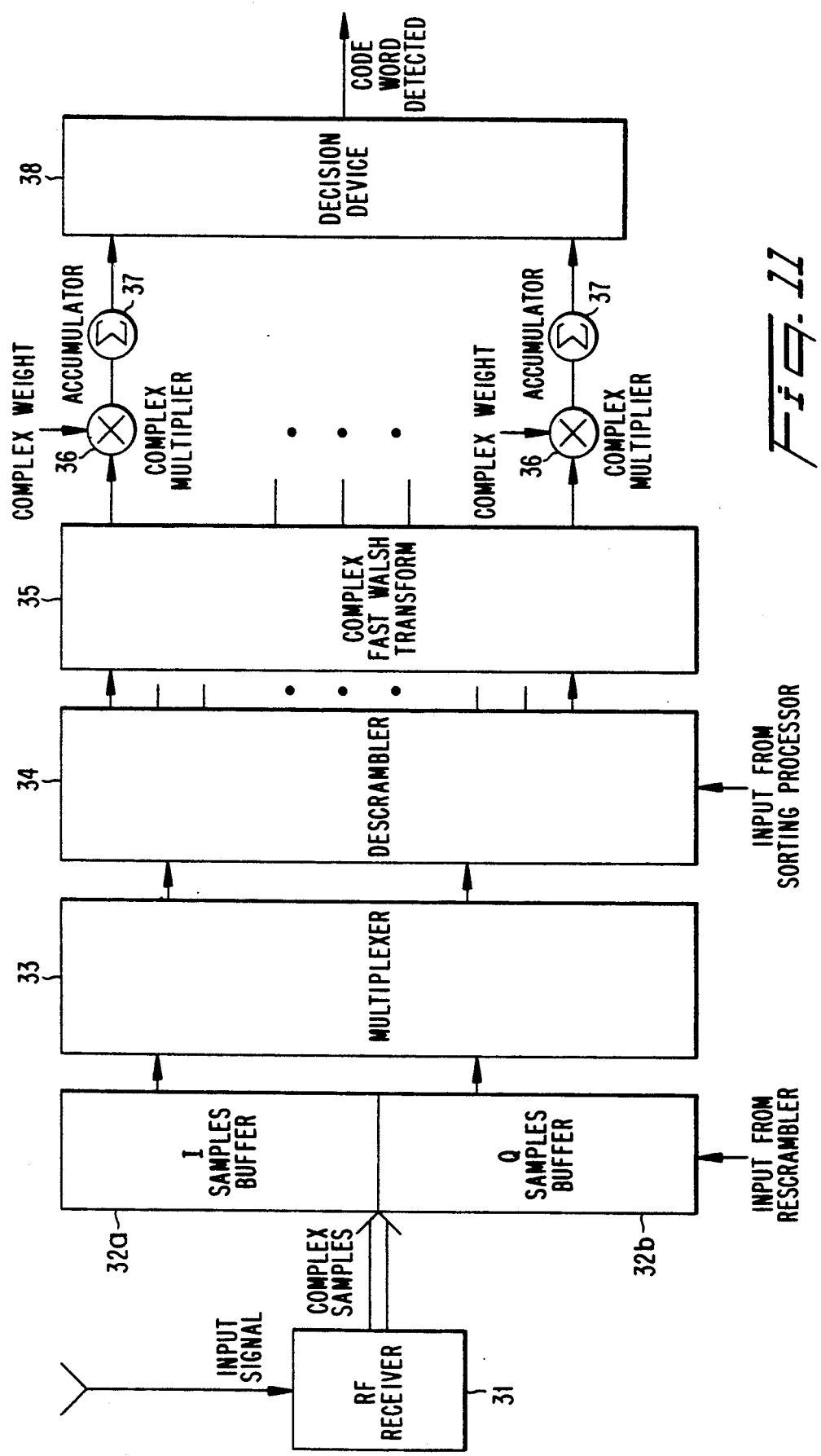
FIG. 11 is a functional schematic of a further embodiment of a WRAKE receiver according to the present invention.

In another preferred embodiment of the present invention a WRAKE receiver is used in a substractive CDMA system of the type described in U.S. Pat. No. 5,151,919, entitled "CDMA Substractive Demodulation" by Paul W. Dent (Ser. No. 628,359, filed Dec. 17, 1990) and the corresponding allowed Continuation-In-Part, U.S. patent application Ser. No. 739,446 filed Aug. 2, 1991. A block diagram of the present WRAKE receiver used in a substractive CDMA system is shown in FIG. 11.

Similar to the WRAKE receiver of FIG. 4, a composite signal is received by a receiver 31 and sampled, producing I and Q chip samples. The samples are buffered in a buffer, which includes two buffers 32a, 32b for I samples and Q samples, respectively. Using the regular WRAKE approach, the multiplexer 33 selects two ranges of samples, not necessarily corresponding to different components (I and Q). Using the limited WRAKE approach, the multiplexer 33 selects a range of I samples and a range of Q samples. In both cases, the sample ranges selected are independent of each other.

A descrambler 34 removes one scrambling code from the samples either by inverting each chip sample or not, depending on the bit polarity of the scrambling code. Next the samples are transferred in parallel to a single correlator 35 which simultaneously correlates the samples with several known code sequences using a fast Walsh transform algorithm. Each sequence correlation result is then multiplied by a complex weight in multiplier 36 and the results are individually accumulated in accumulator 37.

To accumulate multiple wrays, the multiplexer windows are moved and the correlation, weighting, and accumulation processes are repeated. Finally, a decision device 38 determines the largest accumulated result. The index of the largest accumulated result indicates which sequence was detected and thus the signal decoded.

Next, subtraction of the coded signal having just been detected occurs; the process is depicted in FIGS. 11 and 12. Similar to the detection process, the multiplexer selects a range of I samples and a range of Q samples where signal energy is present. These ranges are both descrambled in 34 and sent through the correlator 35. Instead of sending the correlator outputs to the complex multipliers, as in FIG. 11, the correlator outputs are sent to a gating device 39 as shown in FIG. 12. From the previously performed detection process, the output of the decision device 38 determines which complex correlation value is set to zero by opening the corresponding switch in gating device 39. The gating device 39 allows all values to pass through except for the line corresponding to the index detected previously. This is done by closing all but one switch. The line not closed effectively passes a zero value. Thus, the line corresponding to the largest correlation value, as determined by decision device 38, is set to zero by opening the corresponding switch in 39. In this manner one image of the decoded signal is substracted from the composite signal. As depicted in FIG. 12, the remaining spectrum of the composite signal with one component removed is processed in an inverse fast Walsh transform circuit 40 and rescrambled by a rescrambler 41 with the same scrambling code to reconstruct the original signal samples minus the just-substracted signal image. The output of the rescrambler 41 is used to overwrite the original data in the I and Q buffers 32. The process is repeated for other ranges of I and Q samples until all or most of the signal energy is removed. Thus, each information signal is removed from the composite signal after it has been decoded.

The correlation values not passed by the gating device 39 are sent instead to sorting processor 42, which combines these values from different echoes to form an estimate of the signal strength. The sorting processor 42 then orders the signal strengths and associated scrambling codes from greatest to weakest. The code corresponding to the greatest magnitude is transmitted to the descrambler 34 for signal demodulation first. This method of ordering is preferred over other methods because interference is minimized by decoding the strongest signal and then substracting that signal from the composite signal. Once the strongest signal is removed from the composite signal, the next strongest signal may be readily detected without having to account for the interference of the strongest signal.

The residual, composite signal having a first decoded signal removed according to the subtractive demodulation technique is descrambled again by descrambler 34 using the descrambling code of the second signal to be decoded and passed to correlator 35 to be correlated by a second fast Walsh transform for decoding and so on. The order in which signals are decoded and subtracted is governed by the order in which the descrambling codes are used, which in a preferred embodiment are in descending order of the signal strengths.

The contribution of unwanted signals (e.g., interfering) can be further minimized if the digital spreading codes are orthogonal. Two codes are orthogonal if exactly one half of their bits are different. Additionally, bi-orthogonal codes where the code words and their complements are used may be used as digital spreading codes so that an additional bit of information may be conveyed per codeword. It will be understood that only a certain number of orthogonal code words exist for a finite word length and that orthogonality can be maintained only if the relative time alignment between two signals is strictly maintained. The fast Walsh transform, where all the spreading codes may be simultaneously correlated, efficiently uses orthogonal block code words.

Implementation of the WRAKE filtering operations shown in FIGS. 4, 7, 10 and 11 can be done in several ways. The operations can be implemented directly in hardware, using VLSI technology. An alternative is to implement some or all of the operations in a multi-purpose programmable processor, such as a micro-processor or a Digital Signal Processor (DSP). In this embodiment, multiplexing becomes memory accessing with certain addresses. Correlating and multiplication can be performed in the arithmetic logic unit (ALU) of the processor, using registers or other memory to accumulate results.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. In a spread spectrum communications system wherein a transmitter transmits a data signal to a receiver, said receiver comprising:

means for receiving at least two rays of the data signal, wherein the receiving means produces in-phase (I) and quadrature (Q) components for each ray;

means for sampling said I and Q components to produce at least one I sample and at least one Q sample for each ray;

means for selecting at least two wrays of said samples, each wray including I samples or Q samples from any one of said rays; and means for combining said samples in each of said selected wrays to recover the transmitted data signal.

2. In a code division multiple access system for communicating a sequence of data symbols to a receiver, wherein a transmitter combines each data symbol with a known code sequence to form a respective transmitted symbol, said receiver comprising:

means for receiving a composite signal of overlapping modulated carrier signals including at least two rays and for demodulating the composite signal to recover the transmitted symbols in each ray, the receiving and demodulating means producing in-phase (I) and quadrature (Q) components for each ray;

means for sampling said I and Q components to produce at least one I sample and at least one Q sample for each transmitted symbol;

means for selecting at least two wrays of said samples, each wray including I samples or Q samples from any one of said rays;

means for correlating said samples in each of said selected wrays to a known code sequence and generating correlation values;

means for combining said correlation values to generate a combined value; and means for comparing said combined value with a threshold to determine each data symbol corresponding to each transmitted symbol.

3. The system according to claim 2 wherein said selecting means selects said samples from two different wrays, a first wray including I samples from one of said rays and a second wray including Q samples from one of said rays.

4. The system according to claim 2 wherein the combining means includes:

means for multiplying each correlation value by a corresponding weight to produce a plurality of weighted values; and means for summing the weighted values to generate said combined value.

5. The system according to claim 2 wherein the correlation means includes a single complex correlator for correlating each selected wray with said known code sequence.

6. The system according to claim 2 wherein the correlation means includes a single scalar correlator for correlating each selected wray with said known code sequence.

7. The system according to claim 2 wherein the correlation means includes a plurality of complex correlators for correlating each selected wray with said known code sequence.

8. The system according to claim 2 wherein the correlation means includes a plurality of scalar correlators for correlating each selected wray with said known code sequence.

9. In a code division multiple access system for communicating a sequence of data symbols to a receiver, wherein a transmitter combines each data symbol with a known code sequence to form a respective transmitted symbol, said receiver comprising:

means for receiving a composite signal of overlapping modulated carrier signals including at least two rays and for demodulating the composite signal to recover the transmitted symbols in each ray, the receiving and demodulating means producing in-phase (I) and quadrature (Q) components for each ray;

means for sampling said I and Q components to produce at least one I sample and at least one Q sample for each transmitted symbol;

means for selecting at least two wrays of said samples, each wray including I samples or Q samples from any one of said rays;

means for combining said samples in each of said selected wrays to generate groups of combined samples;

means for correlating said groups of combined samples with a known code sequence and generating a correlation value; and means for comparing said correlation value with a threshold to determine each data symbol corresponding to each transmitted symbol.

10. The system according to claim 9 wherein said selecting means selects said samples from two different wrays, a first wray including I samples from one of said rays and a second wray including Q samples from one of said rays.

11. The system according to claim 9 wherein the combining means includes:
   means for multiplying each sample by a corresponding weight to produce a plurality of weighted values; and
   means for summing the weighted values to generate said groups of combined samples.

12. The system according to claim 11 wherein the multiplying means includes a single complex sample-by-sample multiplier for multiplying each sample by said corresponding weight.

13. The system according to claim 11 wherein the multiplying means includes a single scalar sample-by-sample multiplier for multiplying each sample by said corresponding weight.

14. The system according to claim 11 wherein the multiplying means includes a plurality of complex sample-by-sample multipliers for multiplying each sample by said corresponding weight.

15. The system according to claim 11 wherein the multiplying means includes a plurality of scalar sample by sample multipliers for multiplying each sample by said corresponding weight.

16. In a code division multiple access system for communicating data symbols to a receiver, wherein a transmitter maps a stream of data symbols into a stream of code symbols and further combines each code symbol with one scrambling bit sequence to form a stream of respective transmitted scrambled code symbols, the receiver comprising:
   means for receiving a composite signal of overlapping modulated carrier signals including at least two rays and for demodulating the composite signal to recover the transmitted scrambled code symbols in each ray, the receiving and demodulating means producing in-phase (I) and quadrature (Q) components for each ray;
   means for sampling the I and Q components to produce at least one I sample and at least one Q sample for each transmitted scrambled code symbol;
   means for successively selecting at least two wrays of said samples, each wray including I samples or Q samples from any one of said rays;
   means for successively descrambling each wray of samples with the scrambling bit sequence;
   means for successively correlating the descrambled samples in the selected wrays with a set of known code sequences and generating correlation values;
   means for successively combining said correlation values to generate combined values; and
   means for successively comparing the combined values with each other to detect each transmitted scrambled code symbol, said detected scrambled code symbols corresponding to said stream of data symbols.

17. The system according to claim 16 wherein said selecting means successively selects said samples from two different wrays, a first wray including I samples from one of said rays and a second wray including Q samples from one of said rays.

18. The system according to claim 16 further including:
   means for successively removing a selected one of said code symbols corresponding to the detected one of said code symbols from the composite signal to generate a residual composite signal; and
   means for successively reconstructing the original composite signal samples less the selected code symbol from the residual composite signal and transmitting the samples to the selecting means.

19. The system according to claim 18 wherein said reconstructing means further includes:
   means for inverse correlating the residual composite signal; and
   means for rescrambling the residual composite signal to reconstruct the original composite signal without the code symbol corresponding to the detected code symbol using said scrambling bit sequence.

20. The system according to claim 19 wherein said correlating means includes means for computing a fast Walsh transform to correlate the samples to known Walsh-Hadamard sequences and said inverse correlating means includes means for computing an inverse fast Walsh transform to reconstruct samples of the residual composite signal.

21. The system according to claim 18 wherein said comparing means determines which combined value is the largest, and said removing means removes the code symbol, corresponding to the largest correlation value, from the composite signal to form the residual composite signal.

22. The system according to claim 16 wherein the correlation means includes means for computing a fast Walsh transform to correlate the samples to known Walsh-Hadamard sequences.

23. A system according to claim 16 wherein said set of known code sequences are code words from an orthogonal block code.

24. A system according to claim 16 wherein said set of known code sequences are code words from a bi-orthogonal block code.

25. In a code division multiple access system for communicating data symbols to a receiver, wherein a transmitter maps a stream of data symbols into a stream of code symbols and further combines each code symbol with one scrambling bit sequence to form a stream of respective transmitted scrambled code symbols, the receiver comprising:
   means for receiving a composite signal of overlapping modulated carrier signals including at least two rays and for demodulating the composite signal to recover the transmitted scrambled code symbols in each ray, the receiving and demodulating means producing in-phase (I) and quadrature (Q) components for each ray;
   means for sampling the I and Q components to produce at least one I sample and at least one Q sample for each transmitted scrambled code symbol;
   means for successively selecting at least two wrays of said samples, each wray including I samples or Q samples from any one of said rays;
   means for successively descrambling each wray of samples with the scrambling bit sequence;
   means for successively combining said descrambled wrays of samples to generate groups of combined samples; and
   means for successively correlating said groups of combined samples with a set of known code sequences and generating a plurality of correlation values, one for each sequence; and
   means for successively comparing the correlation values with each other to detect each transmitted scrambled code symbol, said detected scrambled code symbols corresponding to said stream of data symbols.

26. The system according to claim 25 wherein said selecting means selects said samples from two different wrays, a first wray including I samples from one of said rays and a second wray including Q samples from one of said rays.

27. The system according to claim 25 wherein the correlation means includes means for computing a fast Walsh transform to correlate the samples to known Walsh-Hadamard sequences.

28. A system according to claim 25 wherein said set of known code sequences are code words in an orthogonal block code.

29. A system according to claim 25 wherein said set of known code sequences are code words in a bi-orthogonal block code.

30. In a code division multiple access system, a method for communicating a sequence of data symbols to a receiver, wherein a transmitter combines each data symbol with a known code sequence to form a respective transmitted symbol, said method comprising the steps of:
receiving a composite signal of overlapping modulated carrier signals including at least two rays;
demodulating the composite signal to recover the transmitted symbols in each ray, producing in-phase (I) and quadrature (Q) components for each ray;
sampling said I and Q components to produce at least one I sample and at least one Q sample for each transmitted symbol;
selecting at least two wrays of said samples, each wray including I samples or Q samples from any one of said rays;
correlating said samples in each of said selected wrays to a known code sequence and generating correlation values;
combining said correlation values to generate a combined value; and
comparing said combined value with a threshold to determine each data symbol corresponding to each transmitted symbol.

31. The method according to claim 30 wherein said step of selecting includes the step of selecting said samples from two different wrays, a first wray including I samples from one of said rays and a second wray including Q samples from one of said rays.

32. The method according to claim 30 wherein said step of combining further includes the steps of:
multiplying each correlation value by a corresponding weight to produce a plurality of weighted values; and
summing the weighted values to generate said combined value.

33. The method according to claim 30 wherein the step of correlating includes correlating each selected wray with said known code sequence using a single complex correlator.

34. The method according to claim 30 wherein the step of correlating includes correlating each selected wray with said known code sequence using a single scalar correlator.

35. The method according to claim 30 wherein the step of correlating includes correlating each selected wray with said known code sequence using a plurality of complex correlators.

36. The method according to claim 30 wherein the step of correlating includes correlating each selected wray with said known code sequence using a plurality of scalar correlators.

37. In a code division multiple access system, a method for communicating a sequence of data symbols to a receiver, wherein a transmitter combines each data symbol with a known code sequence to form a respective transmitted symbol, said method comprising the steps of:
receiving a composite signal of overlapping modulated carrier signals including at least two rays;
demodulating the composite signal to recover the transmitted symbols in each ray, producing in-phase (I) and quadrature (Q) components for each ray;
sampling said I and Q components to produce at least one I sample and at least one Q sample for each transmitted symbol;
selecting at least two wrays of said samples, each wray including I samples or Q samples from any one of said rays;
combining said wrays of samples to generate groups of combined samples;
correlating said groups of combined samples with a known code sequence and generating a correlation value; and
comparing said correlation value with a threshold to determine each data symbol corresponding to each transmitted symbol.

38. The method according to claim 37 wherein said step of selecting includes the step of selecting said samples from two different wrays, a first wray including I samples from one of said rays and a second wray including Q samples from one of said rays.

39. The method according to claim 37 wherein said step of combining further includes the steps of:
multiplying each sample by a corresponding weight to produce a plurality of weighted values; and
summing the weighted values to generate said groups of combined samples.

40. The method according to claim 39 wherein the step of multiplying includes multiplying each sample by said corresponding weight using a single complex sample-by-sample multiplier.

41. The method according to claim 39 wherein the step of multiplying includes multiplying each sample by said corresponding weight using a single scalar sample-by-sample multiplier.

42. The method according to claim 39 wherein the step of multiplying includes multiplying each sample by said corresponding weight using a plurality of complex sample-by-sample multipliers.

43. The method according to claim 39 wherein the step of multiplying includes multiplying each sample by said corresponding weight using a plurality of scalar sample by sample multipliers.

44. In a code division multiple access system, a method for communicating data symbols to a receiver, wherein a transmitter maps a stream of data symbols into a stream of code symbols and further combines each code symbol with one scrambling bit sequence to form a stream of respective transmitted scrambled code symbols, the method comprising the steps of:
receiving a composite signal of overlapping modulated carrier signals including at least two rays and demodulating the composite signal to recover the transmitted scrambled code symbols in each ray, producing in-phase (I) and quadrature (Q) components for each ray;

sampling the I and Q components to produce at least one I sample and at least one Q sample for each transmitted scrambled code symbol;

successively selecting at least two wrays of said samples, each wray including I samples or Q samples from any one of said rays;

successively descrambling each wray of samples with the scrambling bit sequence;

successively correlating the descrambled samples in the selected wrays with a set of known code sequences and generating correlation values;

successively combining said correlation values to generate combined values; and successively comparing the combined values with each other to detect each transmitted scrambled code symbol, said detected scrambled code symbols corresponding to said stream of data symbols.

45. The method according to claim 44 wherein said step of successively selecting includes the step of successively selecting said samples from two different wrays, a first wray including I samples from one of said rays and a second wray including Q samples from one of said rays.

46. The method according to claim 44 further including the steps of:

successively removing a selected one of said code symbols corresponding to the detected one of said code symbols from the composite signal to generate a residual composite signal; and successively reconstructing the original composite signal samples less the selected code symbol from the residual composite signal and transmitting the samples to the selecting means.

47. The method according to claim 46 wherein said step of reconstructing further includes:

inverse correlating the residual composite signal; and rescrambling the residual composite signal to reconstruct the original composite signal without the code symbol corresponding to the detected code symbol using the scrambling bit sequence.

48. The method according to claim 47 wherein said step of correlating includes computing a fast Walsh transform to correlate the samples to known Walsh-Hadamard sequences and said step of inverse correlating includes computing an inverse fast Walsh transform to reconstruct samples of the residual composite signal.

49. The method according to claim 46 wherein said step of comparing determines which combined value is the largest, and said step of removing removes the code symbol corresponding to the largest correlation value from the composite signal to form the residual composite signal.

50. A method according to claim 44 wherein said set of known code sequences are code words from an orthogonal block code.

51. A method according to claim 44 wherein said set of known code sequences are code words from a bi-orthogonal block code.

52. The method according to claim 44 wherein the step of correlating includes computing a fast Walsh transform to correlate the samples to known Walsh-Hadamard sequences.

53. In a code division multiple access system, a method for communicating data symbols to a receiver, wherein a transmitter maps a stream of data symbols into a stream of code symbols and further combines each code symbol with one scrambling bit sequence to form a stream of respective transmitted scrambled code symbols, the method comprising the steps of:

receiving a composite signal of overlapping modulated carrier signals including at least two rays and demodulating the composite signal to recover the transmitted scrambled code symbols in each ray, producing in-phase (I) and quadrature (Q) components for each ray;

sampling the I and Q components to produce at least one I sample and at least one Q sample for each transmitted scrambled code symbol;

successively selecting at least two wrays of said samples, each wray including I samples or Q samples from any one of said rays;

successively descrambling each wray of samples with the scrambling bit sequence;

successively combining said descrambled wrays of samples to generate groups of combined samples;

successively correlating said groups of combined samples with a set of known code sequences and generating a plurality of correlation values, one for each sequence; and successively comparing the correlation values with each other to detect each transmitted scrambled code symbol, said detected scrambled code symbols corresponding to said stream of data symbols.

54. The method according to claim 53 wherein said step of selecting includes the step of selecting said samples from two different wrays, a first wray including I samples from one of said rays and a second wray including Q samples from one of said rays.

55. The method according to claim 53 wherein the step of correlating includes computing a fast Walsh transform to correlate the samples to known Walsh-Hadamard sequences.

56. The method according to claim 53 wherein said set of known code sequences are code words in an orthogonal block code.

57. The method according to claim 53 wherein said set of known code sequences are code words in a bi-orthogonal block code.

58. In a spread spectrum communications system, a method for receiving spread spectrum information signals and determining received data sequences, said method comprising:

receiving a composite signal of overlapping, transmitted signals;

sampling said composite signal;

selecting at least two wrays of composite signal samples; and combining said composite signal samples in each of said selected wrays to recover the transmitted data signal.

* * * * *